Oct. 28, 1930.　　　T. A. CONLON　　　1,779,531
MOUNT FOR GUNS
Filed May 14, 1927　　　2 Sheets-Sheet 1
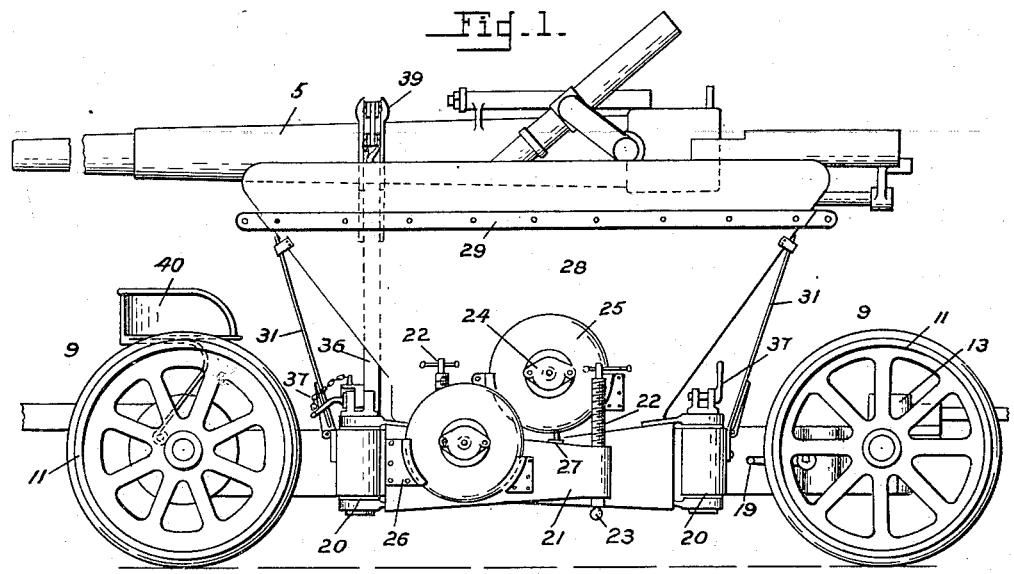
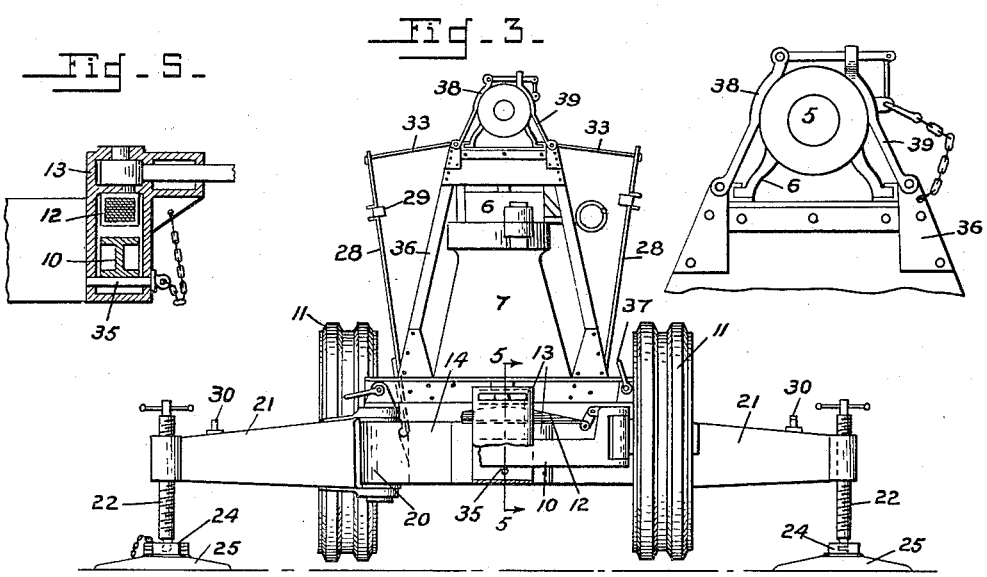
Inventor
Thomas A. Conlon
By W. M. Roach
Attorney

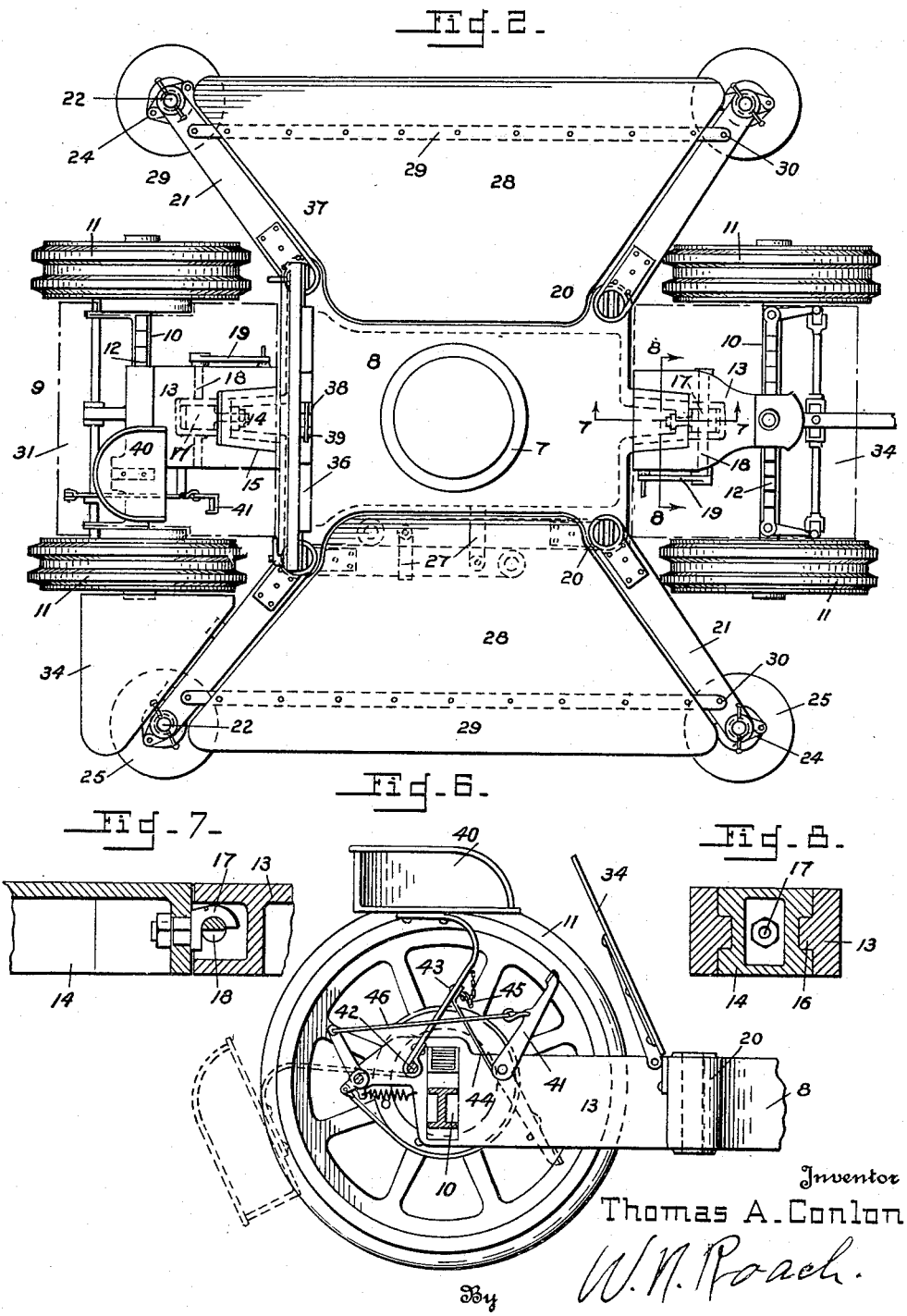

Patented Oct. 28, 1930

1,779,531

UNITED STATES PATENT OFFICE

THOMAS A. CONLON, OF SILVER SPRING, MARYLAND

MOUNT FOR GUNS

Application filed May 14, 1927. Serial No. 191,457.

(GRANTED UNDER THE ACT OF MARCH 3, 1883, AS AMENDED APRIL 30, 1928; 370 O. G. 757)

The invention described herein, may be manufactured and used by or for the Government for governmental purposes without the payment to me of any royalty thereon.

The subject of this invention is a mount for guns.

The tactical employment of anti-aircraft guns which places them along a battle front in support of combat troops brings them within the range of opposing field artillery. As a consequence this type of gun must possess sufficient mobility to follow an advance or cover a retreat and they must be capable of being rapidly emplaced and taken out of action when their position is brought under hostile fire. They should also be capable of being employed as a semi-fixed defense for protecting points in the rear zones of the theater of operations.

The desirability of a weapon suitable to a number of assignments each of which involves different conditions of operation has led to the design of the present mount whose characteristics fulfill all essential requirements without imposing limitations. The gun is mounted on the frame of a vehicle whose axle units may be conveniently removed to enable the mount to be lowered to the ground or they may remain in place and be elevated with the mount until clear of the ground.

With the foregoing and other objects in view, my invention resides in the novel arrangement of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved mount in the traveling position;

Fig. 2 is a plan view of the mount in firing position the end platforms removed;

Fig. 3 is a fragmentary view in front elevation of the mount in a stage of emplacement with the axle units in place;

Fig. 4 is a detail end view of the travelling lock for the cradle;

Fig. 5 is a sectional view on the line 5—5 of Fig. 3;

Fig. 6 is a detail view in side elevation of the rear axle unit with the rear wheel removed, the axle in section;

Figs. 7 and 8 are sectional views taken on the respective lines of Fig. 2.

Referring to the drawings by numerals of reference:

In carrying out the invention the gun 5 with its attendant structure is mounted on a top carriage 6 which is rotatable on a pedestal 7 secured to a base 8. This base is arranged to constitute the frame or body of a wheeled vehicle by attachment to mobile supporting units 9—9, each comprising an axle 10, wheels 11, springs 12, and an axle housing 13 carried by the springs.

One method of attaching the base to the mobile supports consists in forming on the base extensions 14 which are receivable in a recess 15 in the axle housing and have a tongue and groove connection 16 therewith for preventing vertical displacement. The two units are locked against separation by the interengagement of complementary recessed cross shafts 17 and 18, the latter shaft carried by the housing and having an actuating handle 19 which may be made fast to the housing.

Hinged as at 20 to the four corners of the base are outriggers 21 each bearing in its free end a heavy vertically disposed screw jack 22 whose lower extremity is formed into a ball head 23 adapted to be received in a socket 24 on a large circular float 25. In the traveling position the floats are carried in pockets 26 conveniently provided on accessible portions of the mount. The hinges 20 of the front and rear outriggers are offset with respect to each other so that the outriggers on each side of the base may be full length and still be folded together as shown in dotted lines in Fig. 2. They are held in place in traveling position by tie members 27.

Hinged to the four sides of the base are platforms the large side platforms 28 reinforced near their outer edge with a heavy channel bar 29 whose ends are apertured so that when lowered they will receive studs 30 on the outriggers. The end platforms 31 when lowered will be supported by the extension 14 on the base and by the axle housing 13. In the traveling position the side platforms are swung to an upright position where they may be securely held by means of cross ties 33. If desired auxiliary platforms 34 may be provided for the spaces between the wheels and the outriggers.

In emplacing the mount the outriggers are swung out and the floats placed at points equi-distant from the center of the pedestal, the opposite front and rear floats being in line with the center. The jacks are then operated to take the weight of the mount. If the firing is to be conducted without removal of the mobile supports the mount is raised until the springs rise sufficiently to insure relief from firing stresses and a pin 35 is inserted through openings in each axle housing, the openings being arranged so that the pin will engage the axle. The mount is then raised until the wheels are clear of the ground.

When conditions warrant the establishment of a semi-fixed emplacement the shafts 17—18 are disengaged and the mobile supports removed. The screw jacks are then operated until the base and outriggers rest on the ground.

The traveling lock for the cradle consists of a frame 36 detachably secured to the base either front or rear by means of pins 37 and carrying at its upper end a two-part clamp 38—39 which embraces the gun.

The seat 40 which is provided for the operator of the brake lever 41 is hinged as at 42 and has an eye bolt 43 which is arranged to pass through an opening in the end of a strut 44 connected to the brake lever 41. A snap hook 45 engages the eye bolt and when disengaged permits the seat to swing rearwardly. The brake lever is also detachably connected to the link 46 of the brake mechanism and when disengaged drops forwardly to make room for the end platform.

The operations required in converting the mount from the traveling to the firing position or vice versa are few and simple and may be performed with dispatch by the available gun crew.

I claim:

1. In a gun mount, a base, mobile supports including a spring suspended member, means for detachably securing the base and supports, means for inoperating the spring suspension, outriggers hinged to the base and screw jacks in each of said outriggers.

2. In a vehicle mount for guns, a base, mobile supporting units detachably connected to each end of the base equidistantly from the center of the base and emplacing means carried by the base.

3. A vehicle comprising wheeled axle units including a spring suspended member, a body having a tongue and groove connection with said members for preventing vertical displacement and a locking means consisting of complementary recessed interengaging cross shafts carried by the body and members.

4. In a vehicle mount for guns a base, mobile supporting units detachably connected to each end of the base at a point inside the axis of the mobile supporting units, and emplacing means carried by the base.

THOS. A. CONLON.